United States Patent [19]

Eisdorfer

[11] Patent Number: 5,636,269

[45] Date of Patent: Jun. 3, 1997

[54] INTELLIGENT CALL WAITING

[75] Inventor: Jerry Eisdorfer, Somerset, N.J.

[73] Assignee: Lucent Technologies Inc., Murray Hill, N.J.

[21] Appl. No.: 681,607

[22] Filed: Jul. 29, 1996

Related U.S. Application Data

[63] Continuation of Ser. No. 269,730, Jul. 1, 1994, abandoned.

[51] Int. Cl.[6] .............................. H04M 3/42; H04M 1/56
[52] U.S. Cl. ..................... 379/215; 379/142; 379/243; 379/89; 348/14
[58] Field of Search ........................ 379/215, 142, 379/199, 196, 197, 201, 207, 208, 246, 245, 247, 374, 375, 376, 67, 243; 348/14, 89

[56] References Cited

U.S. PATENT DOCUMENTS

| | | | |
|---|---|---|---|
| 4,277,649 | 7/1981 | Sheinbein | 379/215 |
| 4,661,975 | 4/1987 | Brecher | 379/215 |
| 4,794,639 | 12/1988 | Urui et al. | 379/215 |
| 4,873,719 | 10/1989 | Reese | 379/215 |
| 4,878,240 | 10/1989 | Lin et al. | 379/67 |
| 4,893,329 | 1/1990 | O'Brien | 379/373 |
| 4,899,358 | 2/1990 | Blakley | 379/67 |
| 4,922,490 | 5/1990 | Blakley | 370/110.1 |
| 4,947,421 | 8/1990 | Toy et al. | 379/215 |
| 5,007,076 | 4/1991 | Blakley | 379/67 |
| 5,031,205 | 7/1991 | Phillips | 379/373 |
| 5,061,992 | 10/1991 | Ueno | 348/14 |
| 5,109,405 | 4/1992 | Morganstein | 379/142 |
| 5,263,084 | 11/1993 | Chaput et al. | 379/215 |
| 5,289,530 | 2/1994 | Reese | 379/88 |
| 5,309,512 | 5/1994 | Blackmon et al. | 379/215 |
| 5,349,638 | 9/1994 | Pitroda et al. | 379/142 |
| 5,412,711 | 5/1995 | Hayashi | 379/196 |
| 5,467,388 | 11/1995 | Redd, Jr. et al. | 379/196 |
| 5,490,205 | 2/1996 | Kondo et al. | 379/196 |
| 5,491,746 | 2/1996 | Pinard | 379/373 |

*Primary Examiner*—Ahmad F. Matar
*Attorney, Agent, or Firm*—Gregory C. Ranieri; Mony R. Ghose

[57] ABSTRACT

Methods and apparatus are disclosed for using information about a calling party's identity or the importance of a call to control the call waiting signal played to a called party that is busy on another call. Upon determining that a called communication station is busy on another call, information about the identity of the calling party is obtained from the calling station. This information is processed to determine call routing treatment, and particularly to determine whether a call waiting signal is to be played for the call and, if so, what type of call waiting signaling is to be played. The called party can determine information about the identity of the calling party from the call waiting signaling, and thus determine whether to interrupt the call in progress to respond to the call waiting signal. In one exemplary embodiment of the invention, information about the calling party's identity is used to provide a distinctive call waiting signal which identifies the caller as being a particular individual or as a member of a particular group of individuals. In another exemplary embodiment of the invention, information about the calling party's identity controls whether a call waiting signal is played to the called party or suppressed.

11 Claims, 1 Drawing Sheet

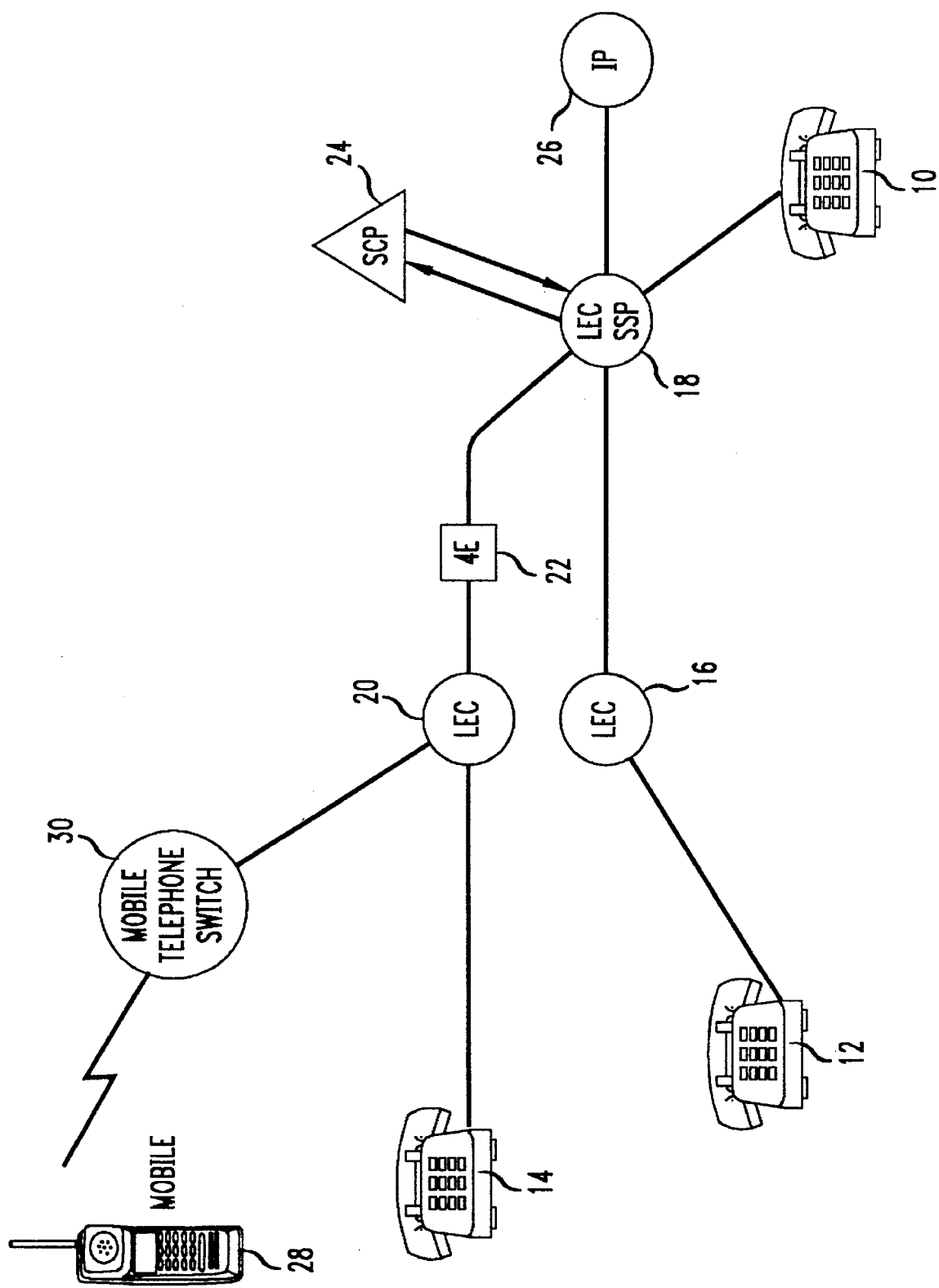

INTELLIGENT CALL WAITING

This application is a continuation of application Ser. No. 08/269,730, filed on Jul. 1, 1994 (now abandoned).

TECHNICAL FIELD

This invention relates to telecommunications services and, more particularly, to improved methods for processing calls, and providing call waiting signals, when the called party is busy on another call.

BACKGROUND OF THE INVENTION

Call waiting features for telephone service are well-known in the art. Call waiting enables a party busy on another call to learn about an incoming call and gives the called party the opportunity to interrupt the ongoing call to accept the incoming call. Currently available call waiting features signal the called party with a single, predetermined tone to indicate that a call is waiting. While call waiting is a useful feature which enables a called party to discontinue lesser important telephone calls in favor of emergency or important calls, subscribers to a call waiting service may be annoyed by unwanted calls. Subscribers may feel that call waiting interferes with the called party's privacy and that important calls are interrupted by unwanted calls. The called party may feel obligated to accept a waiting call on the possibility that the waiting call is important.

Various forms of call waiting have been suggested to alleviate the problem of responding to calls for fear that an important call will be missed. In particular, various forms of caller identification techniques have been combined with call waiting to give the called party an indication of the caller's identity. Having the caller's identity, the called party is in a position to decide whether to interrupt an ongoing telephone call in favor of answering the incoming call. However, these caller identification techniques often require special telephone equipment, such as an Integrated Services Digital Networks (ISDN) phone or a special database for assigning a caller's identity on the basis of the caller's automatic number identifier (ANI).

SUMMARY OF THE INVENTION

The problems of the prior art are overcome in accordance with the invention by using information about the calling party's identity or the importance of a call to control the call waiting signal played to the called party. Upon determining that a called communication station is busy on another call, information about the identity of the calling party is obtained from the calling station. This information is processed to determine call routing treatment, and particularly call waiting signaling, for the call. The called party can determine from the call waiting signaling information about the calling party, and thus determine whether to interrupt the call in progress to respond to the call waiting signal.

In one exemplary embodiment of the invention, information about the calling party's identity is used to provide a distinctive call waiting signal which identifies the caller as being a particular individual or as a member of a particular group of individuals. In another exemplary embodiment of the invention, information about the calling party's identity controls whether a call waiting signal is played to the called party or suppressed.

BRIEF DESCRIPTION OF THE DRAWING

In the drawing:

FIG. 1 is a simplified block diagram of a network, including intelligent network components, suitable for use with the present invention.

DETAILED DESCRIPTION

A call waiting signal is provided to a called party that is busy on a call to indicate that another incoming call is waiting. In accordance with the invention, the call waiting service is provided as an "intelligent" service, in which the call waiting signal delivered to the called party is modified to convey information about the calling party's identity or is suppressed on the basis of the caller's identity. If a calling party calls when the line is currently busy, the network obtains information from or about the calling party, processes the information according to instructions specifying the called party's call waiting service stored in a database, and then provides a distinctive signal to the called party. In this way the called party is given information about the caller's identity from the distinctive call waiting signal and can better determine whether to interrupt the first call to answer the waiting call.

At a high level, call processing according to the invention involves three different steps: (1) collecting information about the caller, (2) processing the collected information according to the called party's call waiting service subscription to determine how to process the call, and (3) executing call processing instructions to play the appropriate call waiting signal to the called party, or to suppress the call waiting signal (and provide a busy signal to the waiting calling party). Several illustrative implementations are described below for each of these three steps, but one skilled in the art will appreciate that other variations and different combinations of these implementations could be used without departing from the principles of the invention.

In the information collection step, the network collects information about the caller's identity, the caller's perception of the importance of the call, or the originating telephone station. When collecting information about the caller's identity, the network may request the caller to enter a personal identifier, such as a personal identification number (PIN) represented by dual tone multi-frequency (DTMF) digits, or a spoken identifier which the network recognizes using speech recognition. Alternatively, the network may collect a speech sample and use well-known voice recognition techniques to determine the identity of the caller. When collecting information about the caller's perception of the importance of the call, the network plays an announcement stating that the called party is busy on another call, and requests that the caller indicate the importance or priority of the call. For example, the caller may indicate that the call is very important and should be received immediately by the caller, or that the caller perceives the call as less important and that the called party need not receive the call immediately. The network uses the caller's assessment of the call's importance, together with the called party's instructions for handling calls of a specified importance, to determine further call processing instructions. When collecting information about the originating telephone station, the network captures the ANI, or a portion of the ANI, of originating telephone station from messages received during call setup.

Having collected information about the caller or call importance, the network processes the call according to the called party's (i.e., the intelligent call waiting service subscriber) instructions. As a function of the caller's identity or call importance, the called party may choose to: (1) suppress the call waiting signal entirely, (2) provide a distinctive call waiting signal (i.e., a tone other than the ordinary call waiting tone that is provided when no PIN is given) to identify the caller as a particular individual or as one of a group of individuals (for example, a group which has access to a PIN specified by the called party), (3) provide a distinctive call waiting signal to identify the call as originating from a particular originating telephone station or as one of a preselected group of originating stations, or (4) route the call to a voice messaging center and receiving an announcement that the caller is leaving a message. In the latter embodiment, the network may signal by a predetermined call waiting signal the identity of the caller leaving the message.

Once it is determined that a call waiting signal should be played, the network further determines the type of signal to be played and plays the appropriate signal. It is to be understood that a call waiting tone or signal as used herein could be a single tone repeated in different patterns, multiple tones of different frequencies, or some combination of the two. Alternatively, the signal could be a voice announcement indicating the caller's identity or identifying the originating telephone station of the waiting call. Moreover, in the case of a video telephone call a call waiting signal may be a picture which differs on the basis of a PIN entered by the caller or the originating ANI. The picture may be a face, a single dot or several dots, different shapes, different colors or shades, blinking shapes, or any combination thereof.

Before describing a specific exemplary network architecture for implementing the invention, it will be useful to describe in a general manner the key intelligent network elements which can be used to implement the invention. Intelligent network systems suitable for implementing the invention, in view of this disclosure, are well-known in the art and are commercially available from AT&T Corp. ("AT&T") under the A-I-Net™ advanced intelligent network family of products.

The intelligent network architecture superimposes on an existing telecommunications system a modular configuration of network elements which provide enhanced telecommunications services. Switching functions are performed by the base network in a conventional manner. The intelligent network includes a service switching point (SSP), a service control point (SCP), and a service management system (SMS). The intelligent network also may include an intelligent processor. One skilled in the art will appreciate that the intelligent network elements could be owned or controlled either by a local exchange carrier (LEC) or an interexchange carrier (IXC), or by both.

The SSP is a switch that operates to recognize service requests, requests call handling instructions from an SCP, and executes those instructions to complete a telephone call. The SSP provides intelligent network "triggering"— detecting a condition which requires the SSP to initiate the intelligent network service by sending a query to the SCP— used by the network to recognize requests. As described below, the intelligent call waiting service of the invention has its own "trigger profile," or set of data, that assigns the service a unique point of entry into intelligent network functions. The SSP also formulates and transmits requests to the SCP and processes replies and requests from the SCP. The SSP creates and plays intelligent network announcements formulated by the service provider (e.g., the local exchange or interexchange carrier), and transmits event messages (such as busy or no reply signals) to the SCP. The SSP illustratively is an AT&T 5ESS® switch provisioned with AT&T's A-I-Net™ intelligent software to provide SSP functionality.

The SCP is an intelligent network element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters. The SCP interfaces with and receives commands for controlling services and service features from the SMS. The SCP illustratively is AT&T's A-I-Net™ SCP.

The SMS is a management and provisioning system that serves as an intelligent network service administration platform. The SMS formulates and sends commands to the SCP to control services and service features. The SMS illustratively is an AT&T A-NET™ service management system.

The intelligent processor provides specialized functionality, such as speech recognition (identifying spoken words) and voice recognition (recognizing the voice of a particular speaker) capability. The intelligent processor also may perform the functions of a video signal generator or video signal database for applications such as providing images for call waiting signals for video telephone calls. The functionality of the intelligent processor may be implemented in a separate network element, or may be implemented through a multimedia SCP. Service provided by the intelligent processor may include, for example, voice digit dialing, name dialing, and voice recognition for authenticating the identity of an individual. Intelligent processor equipment suitable for use with the invention are well known in the art of intelligent network systems.

One area of intelligent call processing that merits special attention is the concept of "triggering." Triggering is the process by which a switch (e.g., an SSP) determines that a query message requesting call processing instructions will be sent to an SCP. A trigger is an occurrence of an event and the satisfaction of certain conditions which results in a message to the SCP. Triggers can be originating triggers, mid-call triggers, or terminating triggers. Examples of originating triggers are off-hook immediate and off-hook delay triggers, and custom dialing plan triggers. An example of a mid-call trigger is the busy condition. An example of a terminating trigger is the ring-no answer condition. One of the more useful triggers for implementing the intelligent call waiting method of the present invention is the busy condition mid-call trigger.

Having described in a general manner the function of the principal intelligent network elements, a specific exemplary network architecture suitable for implementing call waiting in accordance with the invention will now be described with reference to FIG. 1. Assume for purposes of illustration that the called party at telephone station 10 is busy on a call with a party at a telephone station 12, and that there is an incoming call for telephone station 10 from a telephone station 14. The call between telephone stations 10 and 12 extends from telephone station 12 to LEC switch 16, and is routed through LEC switch 18 to the called party at telephone station 10. The call from telephone station 14 is extended to a LEC switch 20 and routed via an IXC switch 22 to LEC switch 18.

LEC switch 18 is provisioned to provide the SSP functionality described above. When the call from telephone station 14 is routed to LEC switch 18, the switch attempts to route the call to telephone station 10. Switch 18 detects that telephone station 10 is busy on another call, which produces a mid-call trigger on the busy condition. That is, the busy condition at telephone station 10 triggers switch 18 to query an SCP 24 for call processing instructions. SCP 24 receives from switch 18 the inquiry and the destination telephone number (i.e., the ANI of telephone station 10), and accesses a database for call processing instructions in accordance with the call waiting service prearranged or subscribed to for telephone station 10.

In an exemplary embodiment of the invention, SCP 24 instructs switch 18, by appropriate messaging well known to those skilled in the art, to collect information from the caller at telephone station 14. SCP 24 notifies switch 18 to play appropriate announcements to the caller and to expect additional inputs (e.g., digits or voice commands) from the caller. Switch 18 plays an announcement to the caller requesting the caller's PIN and collects digits from the caller. Switch 18 forwards the digits to SCP 24, which determines the appropriate call processing on the basis of the caller-provided information. This may be, for example, to play a particular call waiting signal to telephone station 10, to forward the caller to a voice messaging system and indicate to telephone station 10 that the caller is leaving a message, or to suppress a call waiting signal and announce to the caller that calls cannot be accepted at this time. SCP 24 is provisioned to provide call processing instructions via an SMS (not shown). Switch 18 then executes the instructions provided by SCP 24. Of course, one skilled in the art will appreciate that switch 18 performs other functions, such as processing billing records for the call, which are beyond the scope of this invention and need not be described.

Switch 18 may utilize an intelligent processor 26 to perform one or more specialized functions for interfacing with the caller at telephone station 14. For example, if SCP 24 instructs switch 18 to collect a voice print of the caller that will be used to determine the caller's identity, switch 18 will, in some instances, use intelligent processor 26 to collect and analyze the caller's voice print. Intelligent processor 26 would then return to switch 18 an indication of the caller's identity on the basis of the voice print, and switch 18 would provide this information to SCP 24 for further instructions on call processing.

In another embodiment of the invention, intelligent processor 26 provides video signal generation capabilities useful for processing video telephone or multimedia calls. When the caller at telephone station 14 places a video call to telephone station 10, switch 18 again detects that telephone station 10 is busy on another call and queries SCP 24 for call processing instructions. Switch 18 may forward to SCP 24 an indication that the call is a video call, together with the indication of a busy condition and the destination number. Switch 18 and SCP 24 process the call as described above, but may provide a video call waiting signal to telephone station 14. In this instance, SCP 24 specifies to switch 18 the type of video call waiting signal to be provided, and switch 18 requests the appropriate video signal from intelligent processor 26. Intelligent processor 26 then plays the video call waiting signal to telephone station 14.

One skilled in the art will appreciate that various modifications can be made to the network without departing from the scope of the invention. For example, the calls between telephone stations 10 and 12 and between telephone stations 10 and 14 could be routed through other network elements, such as additional IXC switches. Also, the intelligent call waiting service of the invention could be provided to calls to or from mobile telephone, such as a cellular phone, or via cable television facilities. For example, a call placed from mobile telephone 28 (see FIG. 1) via a commercially available mobile telephone switch 30 could be routed through switches 20 and 22 to switch 18 for processing as described above.

I claim:

1. A method of processing a call from a calling communication station to a called communication station, comprising the steps of:

determining whether the called station is busy on a second call;

obtaining information about the identity of a caller at the calling communication station when the called communication station is busy, said information including information selected from the group consisting of a personal identifier and the identity of the caller; and signaling the called communication station with a call waiting signal that is selected from a predetermined plurality of call waiting signals, the call waiting signal being selected as a function of the information about the caller's identity.

2. The method of claim 1 wherein the personal identifier is associated with a particular one of a plurality of call waiting signals to identify the caller.

3. The method of claim 1 wherein a first call waiting signal is delivered to the called station when a personal identifier is not entered at the calling communication station, and a different call waiting signal is delivered to the called station when a predetermined personal identifier is entered at the calling communication station.

4. The method of claim 1 wherein the call waiting signal is selected from among the group of call waiting signals consisting of tones of different frequencies and a tone of a predetermined frequency repeated in different patterns.

5. The method of claim 1 wherein the information step of signaling the called station with a call waiting signal that is selected as a function of the information of the caller's identity comprises providing an indication to the called communication station that a calling party has recorded a message in a voice messaging system.

6. The method of claim 1 wherein the call comprises a video telephone call.

7. The method of claim 6 wherein the selected call waiting signal comprises a video symbol.

8. The method of claim 7 wherein the video symbol comprises an image of the calling party.

9. The method of claim 1 wherein the information further includes an automatic number identifier (ANI) of the calling communication station.

10. The method of claim 1 wherein the information further includes information obtained from the caller about the importance of the call.

11. The method of claim 1 further comprising the step of suppressing signaling of a call waiting signal to the called communication station as a function of the information obtained about the identity of the caller.

* * * * *